United States Patent [19]
Levin et al.

[11] Patent Number: 5,159,170
[45] Date of Patent: Oct. 27, 1992

[54] GRID STRUCTURE FOR REDUCING CURRENT DENSITY IN FOCUSSED ION BEAM

[75] Inventors: James P. Levin, Jericho, Vt.; Alfred Wagner, Brewster, N.Y.

[73] Assignee: International Business Machines Corporation, Armonk, N.Y.

[21] Appl. No.: 692,105

[22] Filed: Apr. 26, 1991

[51] Int. Cl.⁵ ............................................. B23K 15/00
[52] U.S. Cl. ............................. 219/121.25; 250/505.1
[58] Field of Search .................. 219/121.25; 156/643; 250/505.1

[56] References Cited

U.S. PATENT DOCUMENTS

| | | | |
|---|---|---|---|
| 2,925,496 | 2/1960 | Zoubek | 250/49.5 |
| 3,440,466 | 4/1969 | Colvin et al. | 313/35 |
| 3,622,741 | 11/1971 | Steigerwald | 219/121 EB |
| 4,087,695 | 5/1978 | Lee et al. | 250/492 B |
| 4,389,573 | 6/1983 | Itoh | 250/492.2 |
| 4,416,724 | 11/1983 | Fischer | 156/628 |
| 4,450,031 | 5/1984 | Ono et al. | 156/345 |
| 4,457,803 | 7/1984 | Takigawa | 156/626 |
| 4,523,971 | 6/1985 | Cuomo et al. | 156/345 |
| 4,527,044 | 7/1985 | Bruel et al. | 219/121 EB |
| 4,560,878 | 12/1985 | Knauer et al. | 250/492.2 |
| 4,607,333 | 8/1986 | Yasutake et al. | 364/400 |
| 4,620,858 | 1/1986 | Banks et al. | 156/643 |
| 4,758,304 | 7/1988 | McNeil et al. | 156/626 |

Primary Examiner—C. L. Albritton
Attorney, Agent, or Firm—John J. Goodwin

[57] ABSTRACT

A transmission grid is disposed in a conventional focussed ion beam system which includes an ion beam source emitter or ion gun, electrodes to turn the ion beam off and on, a beam defining aperture and electrostatic lenses to focus the ion beam onto a target. The elements of the ion beam system are disposed in a chamber which is provided with an inlet port and an outlet port. Gas is introduced into chamber via the inlet port where it is ionized by the ion beam into an ion plasma to be used to deposit materials onto the target. The transmission grid, is interposed which is a fine mesh, passive element is located in the path of the ion beam and reduces the ion beam current density by a desired value. The transmission grid may be configured with a variety of different transmissions so the current density can be adjusted in different increments depending on the gas/type of deposition to be performed.

2 Claims, 1 Drawing Sheet

GRID STRUCTURE FOR REDUCING CURRENT DENSITY IN FOCUSSED ION BEAM

BACKGROUND OF THE INVENTION

1. Field of the Invention

The present invention relates to ion etching systems, and more particularly to structure to reducing current density in a focussed ion beam deposition system.

2. Description of the Prior Art

In U.S. Pat. No. 4,607,333, entitled ELECTRON BEAM EXPOSURE APPARATUS, issued Aug. 19, 1986 to Yasutake et al, a method for compensating errors in magnetic deflection of an electron beam using an electrostatic deflector is described. No method of reducing current density is described nor is there any description of a grid structure.

In U.S. Pat. No. 4,416,724, entitled METHOD FOR PRODUCING INSULATOR SURFACES, issued Nov. 22, 1983 to Fisher, an ion beam is used to form an insulator. No method of modifying the current density is described. The use of a grid to measure the ion current is described, however, the grid is not used to modify the ion current in this patent. Also, the structure of the grid in the subject disclosure would be different in the use of a much finer grid.

In U.S. Pat. No. 3,622,741, entitled ELECTRON BEAM PROCESSING MACHINE HAVING MEANS FOR DEFLECTING IMPURITIES FROM THE PATH OF ELECTRON BEAM, issued Nov. 23, 1971 to Stelgerwald, a grid is part of an assembly which is used to ionize residual gas and deflect it from the path of the ion beam. No method of reducing the current density is described, and the grid structure and function is distinct from the present invention.

In U.S. Pat. No. 4,523,971, entitled PROGRAMMABLE ION PATTERNING SYSTEM, issued Jan. 18, 1985 to Cuomo et al, a grid with programmable applied voltages is used to produce a pattern on a substrate. The grid is used in a broad area ion source and is not suitable for use with a focussed beam system. This grid could not be used to reduce current density. The grid of the subject invention is a passive element with a fine structure while the grid in the patent is electrically active and is a coarser structure.

In U.S. Pat. No. 4,527,044, entitled APPARATUS FOR TREATING SAMPLE BY PULSED ELECTRON BEAM, issued Jul. 2, 1985 to Bruel et al, no method of reducing the current density is described. A grid is used as a simple, standard, extraction electrode. Again, this grid would not have the structure of the grid of the subject invention.

In U.S. Pat. No. 2,925,496, entitled APPARATUS FOR OBTAINING SUBSTANTIALLY UNIFORM IRRADIATION FROM A NON-UNIFORM SOURCE, issued Feb. 16, 1960 to Zovbek, an ion beam is passed through a shaped hole. By moving the sample, a uniform irradiation is produced from a non-uniform ion beam. No grid is employed and no method of reducing the current density is described.

In U.S. Pat. No. 3,440,466, entitled WINDOW SUPPORT AND HEAT SINK FOR ELECTRON DISCHARGE DEVICE, issued Apr. 22, 1969 to Calvin et al, a grid is used as a heat conductor. No method of reducing current is described.

In U.S. Pat. No. 4,450,031, entitled ION SHOWER APPARATUS, issued May 22, 1984 to Ono et al, a grid is used as a simple standard extractor in a plasma source. The grid is an active part of the source. The structure of the grid is not suitable for varying current density.

In U.S. Pat. No. 4,758,304, entitled METHOD AND APPARATUS FOR ION ETCHING AND DEPOSITION, issued Jul. 19, 1988 to McNeil et al, a grid is used in a simple plasma type ion source. The grids involved are electrically active parts of the ion source, not passive low transmission elements. The structure of the grid in this patent is too coarse for application with a focussed ion beam for varying current density.

U.S. Pat. No. 4,087,695, entitled METHOD FOR PRODUCING OPTICAL BAFFLING MATERIAL USING PULSED ELECTRON BEAMS, issued May 2, 1978 to Lee et al, has no method of modifying current density.

In U.S. Pat. No. 4,389,573, entitled PULSED ELECTRON BEAM DEVICE COMPRISING A CATHODE HAVING THROUGH HOLES, issued Jun. 21, 1983 to Iton, the use of grids to increase electron fluence is described. The grids are an active part of the source and are also too coarse.

In U.S. Pat. No. 4,457,803, entitled PROCESSING METHOD WITH FOCUSED ION BEAMS, issued Jul. 3, 1989, to Takigawa no grid or method of reducing current density is described.

SUMMARY OF THE INVENTION

An object of the present invention is to provide a grid structure transmission mask in the path of the ion beam of an ion beam deposition system to reduce the current density.

Another object of the present invention is to provide a grid structure wherein the reduction in current density by the grid does not affect other ion beam properties such as beam diameter or beam position.

Still another object of the present invention is to provide a grid structure for an ion beam system wherein the grid is embodied as a fine mesh passive element with low ion transmission properties.

DESCRIPTION OF THE PREFERRED EMBODIMENTS

Focussed ion systems typically produce beams with a current density of 0.5 to 5.0 amps per cm2. When using these intense ion beams to deposit materials via the process of ion induced deposition, it is not possible to supply the gas for deposition at a rate which is comparable to the ion arrival rate. This produces undesirable results such as reduced deposition rates, poorer spatial resolution of the deposit, increased sputtering/redeposition, and greatly increased requirements on the deflection and blanking speed of the tool. The present invention provides means for reducing the current density in the beam whereby depletion of the gas on the surface of the sample is avoided which in turn eliminates the problems described above.

Figure 1:
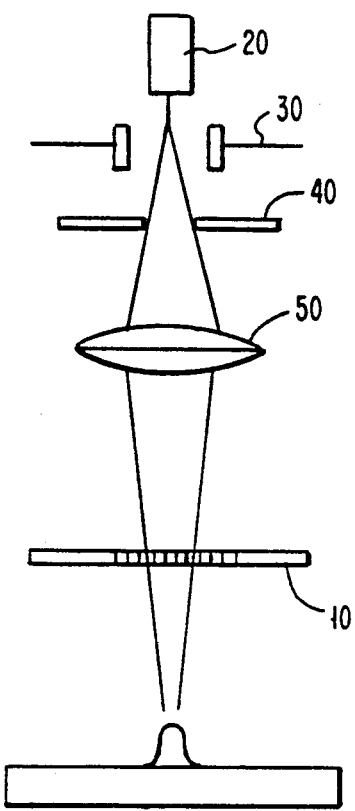
FIG. 1 is a schematic illustration of a focussed ion beam system including a grid structure in accordance with the present invention.

In the present invention, as illustrated in the ion beam system of FIG. 1, the current density is reduced by interposing a grid in the path of the ion beam. The current density can be modified or reduced in direct proportion to the selected transmission of the grid.

In FIG. 1, the transmission grid 10 is disposed in a conventional focussed ion beam system. One skilled in the art appreciates that ion beam systems include an ion source emitter 20 or ion gun, electrodes 30 to turn the ion beam off and on, a beam defining aperture 40, electrostatic lenses 50 to focus the ion beam onto a target 60.

The elements of the ion beam system are disposed in a chamber 70. Chamber 70 is provided with an inlet port 80 and an outlet port 90. Gas is introduced into chamber 70 via inlet port 80 where it interacts with the ion beam 10 and is ionized into an ion plasma to be used to deposit materials onto the target 60 via the process of ion induced deposition in a manner well known to those skilled in the art.

As previously stated, with intense ion beams with high current density, it is not practically possible to introduce the gas for deposition at a fast enough rate comparable to the rapid ion arrival rate from the beam.

Figure 2A:
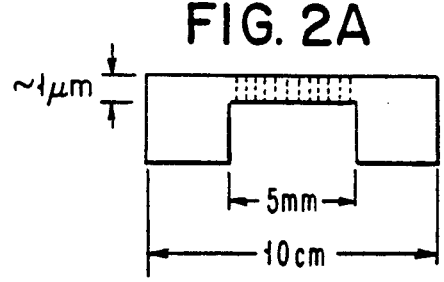
FIG. 2A is an illustration of a side view of a cross section of an ion beam grid apparatus in accordance with the present invention.

Thus, a transmission grid 10 is interposed which is a fine mesh, passive element which reduces the ion beam current density and therefore the ion arrival rate by a desired value. The grid 10 may be configured with a variety of different transmissions so the current density can be adjusted in different increments depending on the gas/type of deposition to be performed. A key feature of the invention is that the reduction in current density is accomplished without affecting any other properties of the ion beam such as beam diameter or beam position. Referring to FIG. 2A, a schematic illustration is presented of a side view of a typical embodiment of a transmission grid 10 configuration including a thin membrane 70 having holes therein to form a mesh.

Figure 2B:
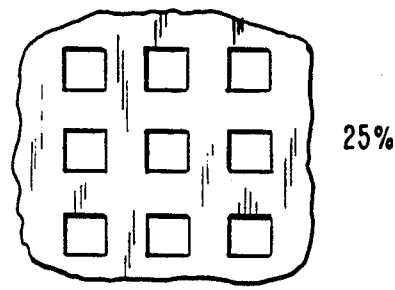
FIG. 2B is a schematic embodiment of a portion of the top of the ion beam grid apparatus which is designed to transmit approximately 25 percent of the ion beam.

FIG. 2B shows the top view of a segment of the membrane mesh 70 with a density and spacing of the holes to permit approximately 25 percent of the ion beam to be transmitted therethrough.

Figure 2C:
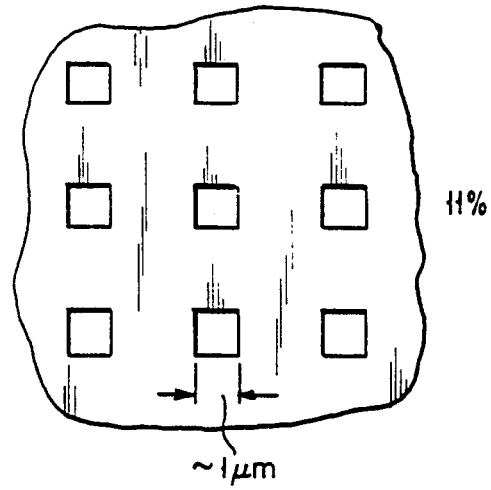
FIG. 2C is a schematic embodiment of another portion of the top of the ion beam grid apparatus which is designed to transmit approximately 11 percent of the ion beam.

FIG. 2C is a similar view of mesh 70 with a smaller hole density to permit approximately 11 percent of the ion beam to be transmitted.

In a typical application, transmission grid 10 includes a thin silicon membrane 5 millimeters square as shown in FIG. 2A and in the order of 1 to 10 microns thick, with a thickness of 2 or 3 microns being usual. The silicon membrane has a plurality of holes etched through to form apertures, such as square openings 1 micron by 1 micron or less in area. The density of the apertures in the grid depends on the desired ion transmission. Typical spacing varies between apertures 2 to 10 microns apart. A 25 percent transmission grid as shown in FIG. 2B will have apertures spaced 3 micrometers apart. An 11 percent transmission grid as shown in FIG. 2C, will have aperture spacings of 1 micron or less.

The area that the grid covers may also be circular, and the silicon membrane may have a low sputter rate material such as tungsten applied. Silicon carbide and silicon nitride are other materials that may be used.

Figure 3:
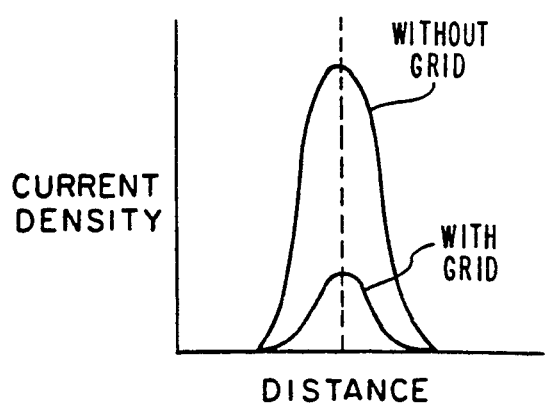
FIG. 3 is an illustration of ion beam spatial distribution of current density as a function of distance on the target.

FIG. 3 shows the current in a focussed ion beam as a function of radial distance. The curve has a gaussian shape which is typical for present focussed ion beam system. The maximum current density is on the order of 1 to 5 amps per cm2 and corresponds to the peak in the curve labelled "without grid". The current density decreases rapidly with radial distances on the order of 0.1 micron. By inserting a transmission grid, the current density in the beam is reduced in direct proportion to the transmission of the grid as shown in the curve labelled "with grid". Note that the gaussian shape of the beam is maintained; only the current density is reduced by the grid. This maintains the high spatial resolution of the focussed ion beam while improving the process of ion beam deposition and etching as described.

Having thus described our invention what we claim as new and desire to secure as Letters Patent, is:

1. In a focussed ion beam system of the type including means for generating a beam of ions having a given current density diameter, and position and focussing means for directing the ion beam onto a target, the improvement characterized in comprising a fine mesh transmission mask located between said beam generating means and said target and disposed in the path of said ion beam for reducing said current density without changing said beam diameter and position, wherein said fine mesh transmission mask is composed of a thin film membrane having closely spaced relatively small diameter holes therein for transmitting less than thirty percent of said ion beam from said source to said target to provide said reduction in said current density, wherein said fine mesh transmission mask is a passive element which changes the current density of said ion beam and does not deflect said ion beam and does not change the diameter of said ion beam, and wherein said focussed ion beam device further includes means for introducing a gas containing particles for deposition onto said target target wherein said ion beam interacts with said gas to cause said particles to deposit onto said target, and wherein said fine mesh transmission mask reduces the current density of said ion beam in accordance with the rate at which said gas is introduced into said focussed ion beam system.

2. A focussed ion beam system according to claim 1 wherein said fine mesh transmission mask is composed of a membrane having a plurality of apertures therein in the order of one micron square, said apertures being spaced apart a selected distance between two to ten microns, said selected aperture spacing determining said reduction in said current density.

* * * * *